United States Patent [19]
Lu et al.

[11] Patent Number: 5,271,376
[45] Date of Patent: Dec. 21, 1993

[54] SERPENTINED TUBULAR HEAT EXCHANGER APPARATUS FOR A FUEL-FIRED FORCED AIR HEATING FURNACE

[75] Inventors: Lin-Tao Lu; Ali Shenasa, both of Fort Smith; Diane M. Jakobs, Alma; Gallen W. Stokes, Fort Smith, all of Ark.

[73] Assignee: Rheem Manufacturing Company, New York, N.Y.

[21] Appl. No.: 41,888

[22] Filed: Apr. 2, 1993

Related U.S. Application Data

[63] Continuation of Ser. No. 791,988, Nov. 14, 1991, abandoned, which is a continuation-in-part of Ser. No. 744,076, Aug. 12, 1991, Pat. No. 5,178,124.

[51] Int. Cl.$^5$ ............................................. F24H 3/10
[52] U.S. Cl. ........................... 126/110 R; 126/116 R; 29/890.049; 29/890.05; 165/109.1; 165/177
[58] Field of Search ................. 126/110 R, 116 R; 29/890.05, 890.049; 138/177; 72/414, 467; 165/177, 109.1, 179, 166, 164, 150

[56] References Cited

U.S. PATENT DOCUMENTS

| | | | |
|---|---|---|---|
| 2,017,201 | 10/1935 | Bossart et al. | 165/177 |
| 2,096,272 | 10/1937 | Young | 138/38 |
| 2,190,349 | 2/1940 | Beam | 126/110 |
| 2,324,707 | 7/1943 | Johnson | 62/141 |
| 2,347,957 | 5/1944 | McCullough | 165/150 |
| 2,525,400 | 10/1950 | Crawford | 126/110 |
| 2,682,867 | 7/1954 | Cartter | 126/116 |
| 2,733,908 | 2/1956 | Graham | 263/20 |
| 3,294,082 | 12/1966 | Norris | 126/116 |
| 3,306,353 | 2/1967 | Burne | 165/164 |
| 3,592,029 | 7/1971 | Ritter | 29/890.053 X |
| 3,779,312 | 12/1973 | Withers, Jr. et al. | 165/184 |
| 3,800,868 | 4/1974 | Berkowitz et al. | 165/170 |
| 3,826,304 | 7/1974 | Withers, Jr. et al. | 165/1 |
| 4,175,419 | 11/1979 | Mabery | 29/890.053 X |
| 4,470,452 | 9/1984 | Rhodes | 165/153 |
| 4,561,421 | 12/1985 | Hwang et al. | 126/110 R |
| 4,589,481 | 5/1986 | Manssom | 165/172 |
| 4,641,705 | 2/1987 | Gorman | 165/109.1 X |
| 4,708,197 | 11/1987 | Robbins | 165/54 |
| 4,732,713 | 3/1988 | Korsel | 165/166 X |
| 4,781,248 | 11/1988 | Pfeiffer | 165/166 X |
| 4,794,983 | 1/1989 | Yoshida et al. | 165/133 |
| 4,807,588 | 1/1989 | Bentley et al. | 126/110 R |
| 4,848,314 | 7/1989 | Bentley | 126/116 R |
| 4,907,648 | 3/1990 | Emmerich et al. | 165/166 |
| 4,923,045 | 5/1990 | Fletcher et al. | 165/175 |
| 4,955,435 | 1/1990 | Shuster et al. | 165/170 |
| 4,974,579 | 12/1990 | Shellenberger | 126/110 R |
| 5,094,224 | 3/1992 | Diesch | 126/391 |
| 5,099,576 | 3/1992 | Shinmura | 29/890.053 X |

OTHER PUBLICATIONS

Kays & London, "*Compact Heat Exchangers*" (1984) pp. 173, 179.

(List continued on next page.)

Primary Examiner—Carl D. Price
Attorney, Agent, or Firm—Konneker, Bush & Hitt

[57] ABSTRACT

A fuel-fired condensing furnace is provided with a specially designed heat exchanger structure having a metal primary section and a plastic secondary or recuperative section. The primary section is defined by a horizontally spaced series of identically sized, vertically serpentined metal combustor tubes adapted to receive a through-flow of a burning fuel-air mixture discharged from the furnace burner section. Each tube has an essentially straight inlet combustion section sized to permit essentially complete combustion therein of the burning fuel-air mixture received by the tube, and a plurality of vertically spaced horizontal heat transfer sections that are horizontally flattened and narrowed to enhance their combustion heat transfer to supply air being forced upwardly through the furnace housing. The heat transfer efficiency of the flattened tube sections is further enhanced by forming spaced series of indentations in their flattened opposite side walls to create combustion gas flow turbulence within their interiors, and air flow turbulence along their exterior surfaces.

15 Claims, 4 Drawing Sheets

OTHER PUBLICATIONS

J. Redman, Non-Metallic Heat Exchanger The Chemical Engineer, No. 17, pp. 17-26, Apr. 1989.

D. M. Bigg, Stickford & Talbert-Application of Polymeric Materials for Condensing Heat Exchangers, Polymer Eng. & Sciences, vol. 29, No. 16, pp. 1111-1116, Aug. '89.

B. S. Mora & S. R. Plucinsky-High Temperature Engineering Plastics for Use in Condensing Heat Exchangers Proceedings of the 1987 Intl. Symposium on Condensing Heat Exchangers BNL-52068, CRT-87-00912, pp. 235-252, Apr., 1987.

F. Preto et al.-Development & Performance of a High Efficiency Gas-Fired Furnace Equipped with a Plastic Condensing Heat Exchanger Proceedings of the '87 Intl. Symposium on Condensing Heat Exchangers-BNL-52068, CRT-87-0091.2, pp. 183-198 Apr. '87.

SERPENTINED TUBULAR HEAT EXCHANGER APPARATUS FOR A FUEL-FIRED FORCED AIR HEATING FURNACE

This is a continuation of application Ser. No. 791,988, filed Nov. 14, 1991, now abandoned.

CROSS-REFERENCE TO RELATED APPLICATION

This application is a continuation-in-part of U.S. application Ser. No. 744,076, now U.S. Pat. No. 5,178,124 filed on Aug. 12, 1991 and entitled "Plastic Secondary Heat Exchanger Apparatus for a High Efficiency Condensing Furnace", which is hereby incorporated by reference herein.

BACKGROUND OF THE INVENTION

The present invention relates generally to heat exchanger apparatus, and more particularly relates to combustion heat exchanger apparatus used in fuel-fired forced air heating furnaces.

In a fuel-fired forced air furnace, air returned from the conditioned space served by the furnace is flowed across a hollow combustion heat exchanger disposed within the furnace housing while the heat exchanger receives a throughflow of a burning fuel/air mixture discharged from the furnace burner section. As the air externally traverses the heat exchanger, combustion heat is transferred to the air from the outer surface of the heat exchanger. The heated air is then discharged from the furnace for resupply to the conditioned space.

Furnace heat exchangers of the type described are required to simultaneously and efficiently perform two functions. First, they must interiorly provide for essentially complete combustion of the burning fuel/air mixture received thereby with an acceptably low level of exhaust emissions. Second, they must also provide for efficient combustion heat transfer to the supply air being flowed through the furnace.

In conventional furnace heat exchanger design, meeting each of these two goals has proven to be a challenge since the heat exchanger geometry needed to provide a high degree of combustion efficiency is often markedly different than that required to provide a high degree of combustion product-to-air heat transfer efficiency. In other words, a good heat exchanger geometry for combustion may be much less desirable for its simultaneous heat transfer task, and vice versa.

One approach used to overcome these competing geometric needs has been to fashion the heat exchanger in two sections—one combustion section and one heat transfer section—of different geometric configurations. An example of this design approach may be seen in U.S. Pat. No. 4,974,579 to Shellenberger et al in which a furnace heat exchanger is illustrated as having a combustion section formed from a spaced series of relatively large diameter metal tubes, and a heat transfer section formed from a spaced series of relatively small diameter metal tubes. The large diameter combustion tubes provide the relatively large combustion volume necessary to provide for high combustion efficiency, low CO emission and low combustion noise, while the smaller diameter heat transfer tubes provide enhanced heat transfer capacity due to their relatively higher surface area and heat transfer coefficient.

A limitation in this approach is the need for an intermediate portion to connect the differently configured combustion and heat transfer sections of the heat exchanger—for example, a metal collector box as illustrated in the aforementioned U.S. Pat. No. 4,974,579. The use of these three separate heat exchanger sections of course adds to the expense of manufacturing and fabricating the heat exchanger. Additionally, because of the high temperature of the combustion gases exiting the large tube combustion section of the heat exchanger the intermediate section thereof needs to be of a rugged metal construction to withstand the high thermal stress levels experienced.

In an attempt to reduce the cost of forming a tubular metal furnace heat exchanger, a serpentined array of metal heat exchanger tubes, of a single size, has been investigated. While this approach is more economical as to manufacturing and fabrication costs, it entails a somewhat undesirable tradeoff between combustion and heat transfer efficiency as discussed above. For example, by using relatively large diameter tubes to form the entire heat exchanger, high combustion efficiency is achieved. However, this relatively large diameter tube size is not particularly efficient from a heat transfer standpoint. Accordingly, from an overall tubing length standpoint it was necessary to oversize the heat exchanger to provide it with sufficient heat transfer capacity. This made the heat exchanger voluminous and caused excessive pressure losses both in the flue gas side and the air side of the heat exchanger.

In view of the foregoing it can readily be seen that a need exists for an improved furnace heat exchanger construction that provides a high degree of both combustion and heat transfer efficiency. It is accordingly an object of the present invention to provide such an improved furnace heat exchanger construction.

SUMMARY OF THE INVENTION

In carrying out principles of the present invention, in accordance with a preferred embodiment thereof, a fuel-fired forced air heating furnace is provided with a uniquely configured heat exchanger structure having enhanced heat transfer capabilities together with other operational and fabricational advantages.

The heat exchanger structure is positioned within a housing portion of the furnace, in the path of supply air being forced through the housing for heating therein, and comprises a spaced series of tubular metal heat exchange members. Each of the tubular heat exchange members is serpentined in a direction parallel to the supply air flow through the housing and is adapted to receive an internal throughflow of hot combustion gas from a source thereof such as a fuel/air burner. During operation of the furnace, the serpentined tubes externally transfer combustion gas heat to the supply air being flowed through the furnace housing.

According to a feature of the present invention, each of the serpentined metal tubes has an essentially straight inlet end portion sized to permit essentially complete combustion of the burning fuel-air mixture received by the tube, and at least one essentially straight heat transfer section that is parallel to the combustion section and spaced apart therefrom in a direction parallel to the supply air flow through the furnace housing. Each tube heat transfer section is flattened on opposite sides thereof in a manner substantially narrowing it, relative to its associated combustion section, in a direction transverse to the supply air flow direction. This flattening and narrowing of the tube heat transfer sections increases their effective external fluid heat transfer surface areas, thereby advantageously enhancing the internal combustion gas-to-external supply air heat transfer capabilities of the overall heat exchanger structure.

According to another aspect of the present invention, indentation means are formed in the opposite flattened sides of the narrowed tube sections and are operative to create heat transfer-enhancing combustion gas turbulence within such tube sections during operation of the heating appliance. In one representative embodiment thereof, these indentation means include series of indentations formed on the flattened opposite side portions of the narrowed tube sections.

The indentations on each tube section side are spaced apart from one another in a direction parallel to the tube section axis and are each elongated in a direction parallel to such axis, with the indentations on one side of each flattened tube section being axially staggered relative to the indentation series on the other side of the tube section. This staggering of the opposed pairs of indentation series creates a zig-zag secondary combustion gas flow pattern within the flattened tube sections that further enhances their heat transfer capacities.

In another embodiment thereof, the indentation means comprise axially spaced series of elongated parallel indentations formed on the opposite flattened sides of each narrowed tube section and positioned in facing pairs on opposite sides of its axis. The indentations in each facing pair thereof are longitudinally sloped at generally equal but opposite acute angles relative to the direction of fluid flow externally across the serpentined tubes.

Additionally, the indentations in each facing pair thereof are convexly curved into the interior of their associated tube section and meet, along longitudinally central portions thereof, along a flattened area disposed within the interior of the tube section and having a pointed leading edge section facing in an upstream direction relative to combustion gas flow through the flattened and narrowed tube section. This indentation pattern creates a secondary combustion gas flow pattern within each of the flattened tube sections, in a direction parallel to the fluid flow externally across the tube section, the resulting combustion gas turbulence further enhancing the heat transfer capacity of the flattened tube sections. The criss-crossed indentation patterns on the flattened tube sections additionally increases their heat transfer capacities by creating turbulence in the external fluid stream as it flows along the exterior surfaces of the flattened tube sections.

The flattened tube sections and their associated turbulence-inducing indentation means may be simultaneously formed in each of the serpentined tubes using suitable press die apparatus. In a further embodiment of the serpentined tubes, the indentation means are eliminated and the combustion gas turbulence is created instead by turbulator structures positioned in nonflattened sections of the tubes. In yet another embodiment of the tubes, the indentations are omitted, and outlet end portions of the tube combustion sections are flattened and narrowed to reduce the temperature of the combustion gas entering the heat transfer portion of the heat exchanger structure In an illustrated preferred embodiment of the furnace, the various embodiments of the aforementioned serpentined tubular metal heat exchanger structure are utilized as the primary heat exchanger section in a recuperative heat exchanger assembly in which the secondary heat exchanger portion thereof is of a plastic construction as illustrated and described in U.S. application Ser. No. 744,076 of which the present application is a continuation-in-part.

DETAILED DESCRIPTION

Figure 1:
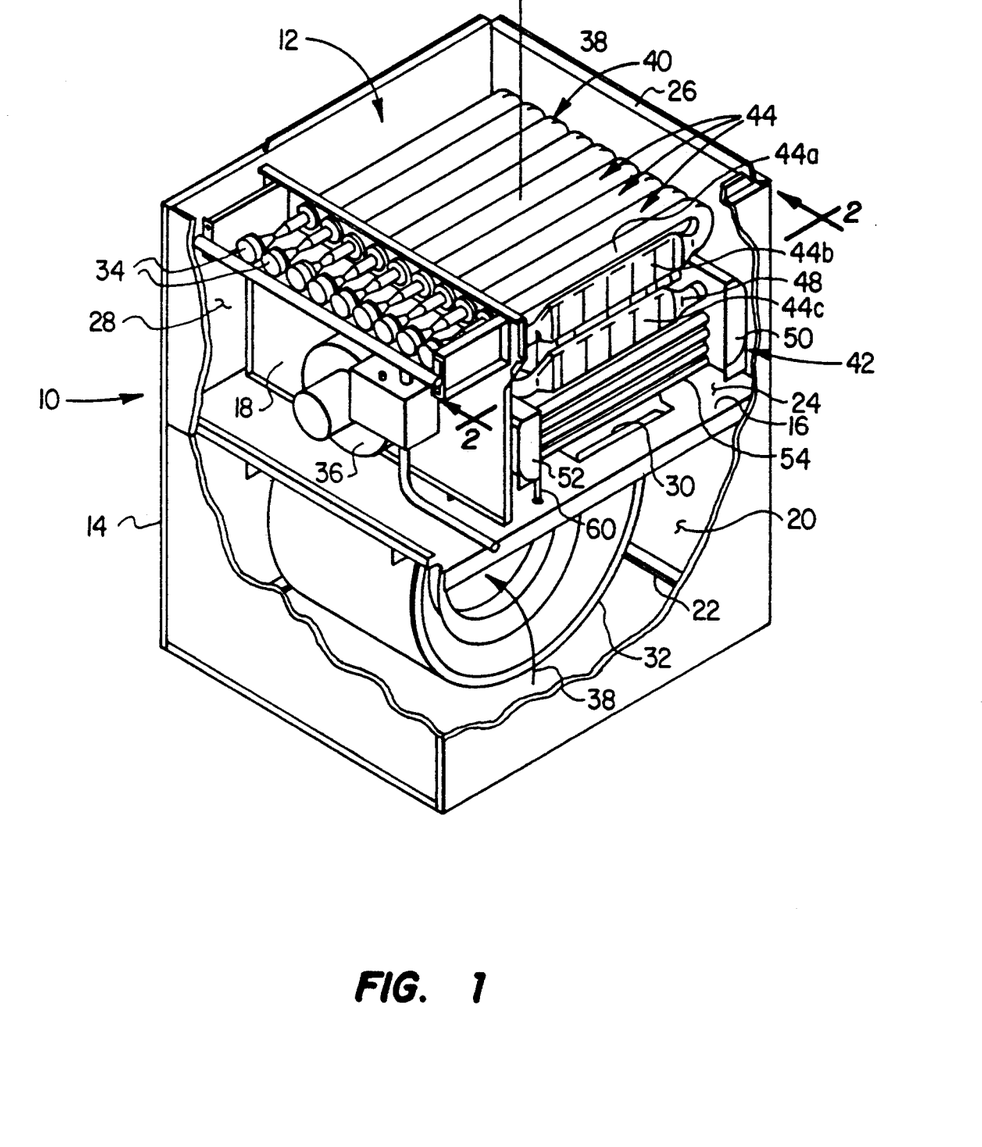
FIG. 1 is a partially cut away perspective view of a representative fuel-fired forced air heating furnace having incorporated therein a uniquely configured serpentined heat exchanger structure embodying principles of the present invention.

Perspectively illustrated in FIG. 1 is a fuel-fired forced air heating furnace 10 having incorporated therein a specially designed heat exchanger structure 12 embodying principles of the present invention. Furnace 10 representatively is of a recuperative type having an upflow configuration and includes an outer housing 14 internally divided by horizontal and vertical partition walls 16, 18 into a return plenum 20 provided with a bottom air inlet opening 22; a supply air flow passage 24 positioned above the return plenum and having a top air outlet opening 26; and an equipment chamber 28 positioned above the plenum 20 and to the left of the air flow passage 24.

The heat exchanger structure 12 is operatively mounted in the supply air flow passage 24 directly above a rectangular opening 30 formed through the horizontal housing partition 16. Opening 30 is connected to the outlet of a centrifugal supply air blower 32 disposed in the return air plenum 20. A horizontally spaced series of shot-type fuel/air burners 34 are mounted in the chamber 28 above a draft inducer fan 36.

Figure 2:
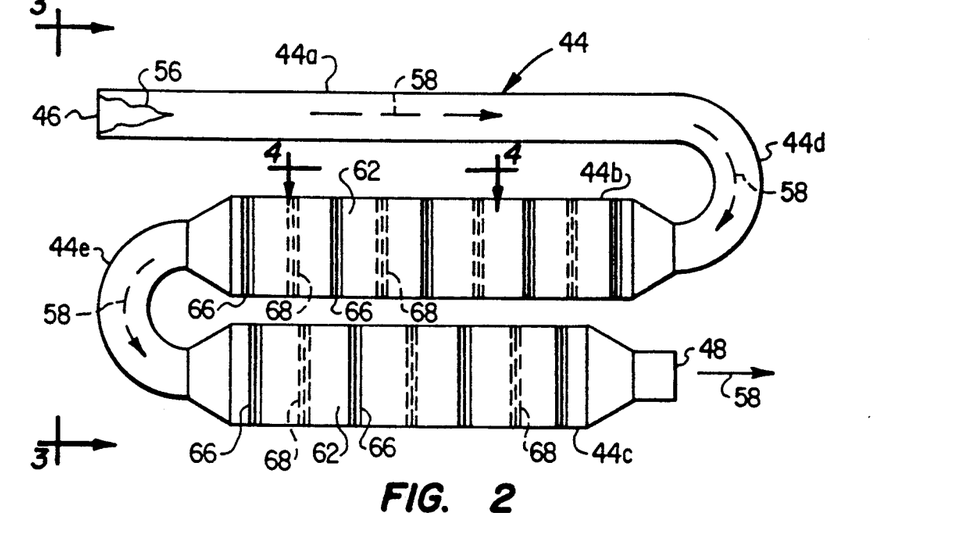
FIG. 2 is an enlarged scale side elevational view of the primary section of the heat exchanger structure taken along line 2—2 of FIG. 1.
Figure 3:
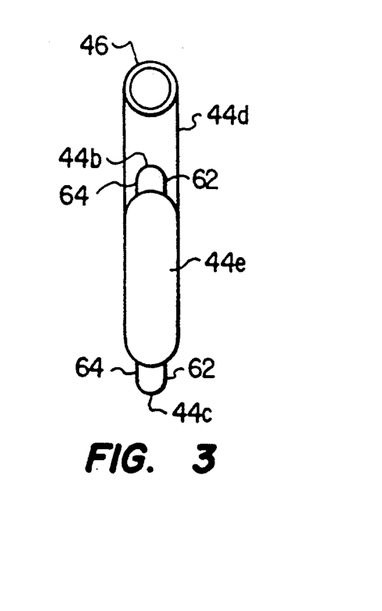
FIG. 3 is an enlarged scale end elevational view of one of the serpentined tube portions of the heat exchanger structure taken along line 3—3 of FIG. 2.

Referring now to FIGS. 1 and 2, the heat exchanger structure 12 includes a primary section 40 positioned above a secondary section 42. Primary section 40 comprises a horizontally spaced series of vertically serpentined tubular metal heat exchanger members 44. Each member 44, as best illustrated in FIG. 2, representatively has an essentially straight horizontal top combustion section 44$_a$ with a leftwardly facing open inlet end 46; an essentially straight intermediate horizontal section 42$_b$ parallel to and spaced downwardly apart from section 44$_a$; and an essentially straight bottom horizontal section 44$_c$ parallel to and spaced downwardly apart from section 44$_b$, and having a rightwardly facing open outlet end 48. The right ends of tube sections 44$_a$, 44$_b$ are joined by a generally U-shaped portion 44$_d$ of the tube 44, and the left ends of tube sections 44$_b$, 44$_c$ are joined by a generally U-shaped section 44$_e$ of the tube 44.

The secondary heat exchanger section 42 (FIG. 1) is similar in construction and operation to that shown and described in the aforementioned copending U.S. application Ser. No. 744,076 and includes an inlet collector box 50 connected to the outlet ends 48 of the tubular heat exchanger members 44; an outlet collector box 52 spaced leftwardly apart from collector box 50 and connected to the inlet of draft inducer fan 36; and a horizontally spaced series of elongated, hollow extruded plastic heat exchanger members 54 (only one of which is visible in FIG. 1) connected at their opposite ends to the collector boxes 50 and 52.

Referring still to FIGS. 1 and 2, during operation of furnace 10, each of the burners 34 receives a fuel/air mixture and responsively creates a flame 56 (FIG. 2) which enters the inlet end 46 of one of the tubular heat exchanger members 44 and generates hot combustion gases 58 therein. Operation of the draft inducer fan 36 sequentially draws the hot combustion gases 58 in each of the serpentined heat exchanger members 44 through the members 44 as indicated by the arrows in FIG. 2, into the inlet collector box 50, leftwardly through the plastic secondary heat exchanger members 54 into the outlet collector box 52, and then discharges the combustion gases to a suitable exhaust flue (not shown).

As the hot combustion gases are flowed through the heat exchanger structure 12 in this manner, the supply air 38 (FIG. 1) is forced upwardly and externally across the heat exchanger structure 12 by operation of the supply blower 32. Combustion heat from the gases 58 is transferred from the heat exchanger structure 12 to the air 38, thereby heating it prior to its delivery to the conditioned space served by the furnace 10. Condensate formed in the secondary heat exchanger section 42 is carried away therefrom by a condensate drain line 60 (FIG. 1) connected to the outlet collector box 52.

Referring now to FIGS. 2–5, in accordance with a feature of the present invention, each of the longitudinally intermediate tube sections 44$_b$ and 44$_c$ is flattened and narrowed, in a direction transverse to its longitudinal axis and the flow direction of air 38, to provide the section with oppositely facing, vertically enlarged parallel flat side walls 62 and 64 and a vertically enlarged, generally oval cross-section along its length.

Figure 4:
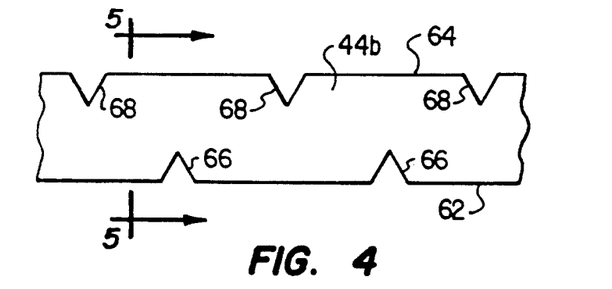
FIG. 4 is an enlarged scale partial top plan view of a horizontally flattened section of the tube portion taken along line 4—4 of FIG. 2.
Figure 5:
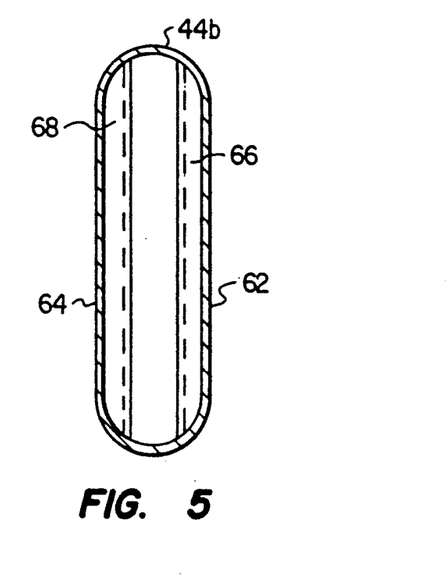
FIG. 5 is an enlarged cross-sectional view through the flattened tube section taken along line 5—5 of FIG. 4.

Additionally, series of vertically elongated, horizontally spaced indentations 66 and 68 are respectively formed in the opposite side wall pairs 62 and 64, the indentations longitudinally extending parallel to the direction of air flow through the supply air flow passage 24 (FIG. 1). As best illustrated in FIGS. 2 and 4, each series of indentations 66 is staggered, in a direction parallel to its associated tube section axis, relative to its oppositely disposed series of side wall indentations 68. On each serpentined tube 44, the flattening of its longitudinally intermediate sections 44$_b$ and 44$_c$, and the formation of the side wall indentations 66 and 68, may be simultaneously effected using a suitable press die structure.

Each of the tubes 44 is sized so that the combustion of the fuel/air mixture entering its inlet end 46 is essentially completed within its upper horizontal section 44$_a$. Accordingly, the top tube sections 44$_a$ of the primary heat exchanger section 40 collectively define what may be termed a combustion portion thereof, with the remaining portions of the tubes collectively defining what may be termed a heat transfer portion of the primary heat exchanger section 40.

The heat transfer portion of the serpentined primary heat exchanger section 40 provides the bulk of the combustion gas-to-supply air heat transfer from the primary heat exchanger section, and such heat transfer is advantageously enhanced by both the horizontal flattening of the tube sections 44$_b$, 44$_c$ and the formation of the side wall indentations 66, 68 therein. The horizontal flattening and narrowing of the tube sections 44$_b$, 44$_c$ reduces the air pressure drop across the heat transfer section while at the same time increasing the effective exterior heat transfer surface thereof. The staggered indentation of the flattened tube side walls 62, 64 enhances their internal heat transfer by causing the combustion throughflow to make a zig-zag path through the flattened tube sections which creates turbulence and a secondary combustion gas flow in a direction transverse to their longitudinal axes. Additionally, the boundary layer developed on the inside surface of the flattened tube sections is advantageously broken up by the side wall indentations therein.

From the foregoing it can readily be seen that a primary advantage provided by the configuration of the tubular metal heat exchanger member 44 is that it may be conveniently formed from a single tube, yet is provided, by means of a simple and rapidly effected die press operation, with separate combustion and heat transfer sections of different geometries that permit the two sections to very efficiently perform their combustion and heat transfer functions. No separate structure is required to operatively join the combustion and heat transfer sections, thereby providing for a more economical construction of the overall heat exchanger structure.

An alternate embodiment 70 of the heat exchanger member 44 is depicted in FIGS. 6–9. Like the member 44, the heat exchanger member 70 is formed from a single length of metal tubing and has an essentially straight horizontal top combustion section 70$_a$ with a leftwardly facing open inlet end 72; an essentially straight intermediate horizontal section 70$_b$ parallel to and spaced downwardly apart from section 70$_a$; and an essentially straight bottom horizontal section 70$_c$ parallel to and spaced downwardly apart from section 70$_b$ and having a rightwardly facing open outlet end 73 connectable to the inlet collector box 50 (FIG. 1). The right ends of the tube sections 70$_a$, 70$_b$ are joined by a generally U-shaped portion 70$_d$ of the tube 70, and the left ends of tube sections 70$_b$, 70$_c$ are joined by a generally U-shaped section 70$_e$ of the tube 70.

Figure 6:
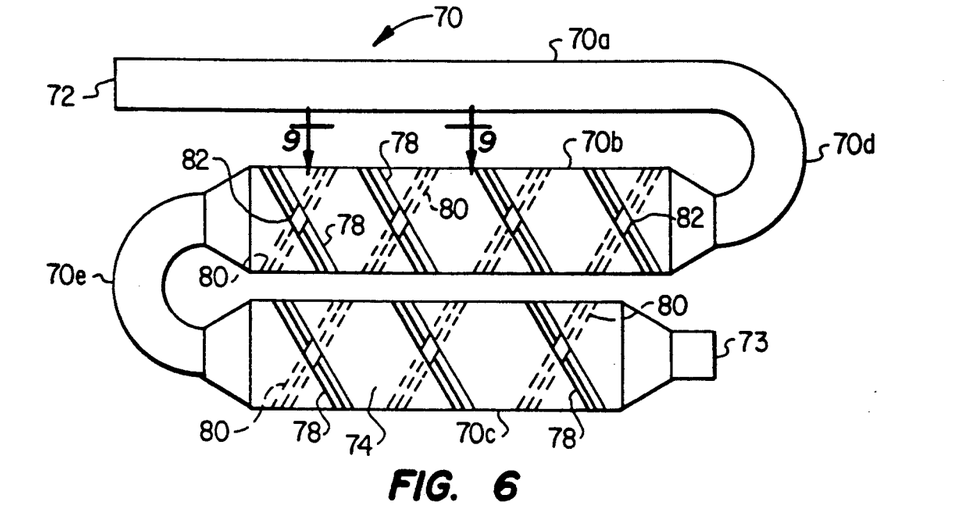
FIG. 6 is a side elevational view of an alternate embodiment of one of serpentined tube portions of the heat exchanger structure.
Figure 7:
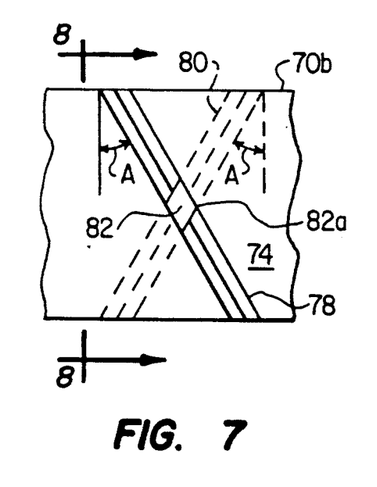
FIG. 7 is an enlarged scale partial side elevational view of a horizontally flattened section of the FIG. 6 tube.

Each of the tube sections 70$_b$ and 70$_c$ is flattened and narrowed, in a direction transverse to its longitudinal axis and the flow direction of air 38, thereby providing the section with oppositely facing, vertically enlarged parallel flat side walls 74 and 76 and a vertically enlarged, generally oval cross-section along its length.

Figure 8:
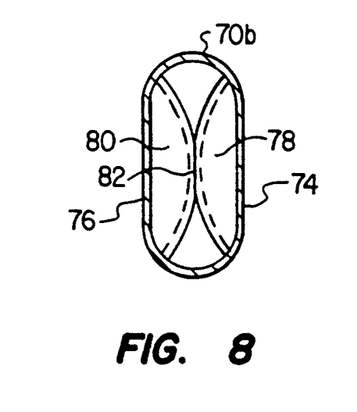
FIG. 8 is a cross-sectional view through the flattened tube section taken along line 8—8 of FIG. 7.
Figure 9:
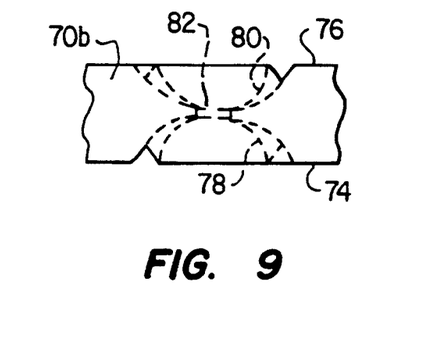
FIG. 9 is a partial top plan view of the flattened tube section taken along line 9—9 of FIG. 6.

Horizontally spaced series of indentations 78 and 80 arranged as shown in opposing pairs, are formed in the opposite flattened tubing side walls 74 and 76. Each of the indentations 78 forms an acute angle A (representatively 30 degrees) with vertical, while each of the indentations 80 forms an equal but opposite angle A with vertical. As best illustrated in FIGS. 8 and 9, the indentations in each opposing pair thereof and concavely curved toward the center of their associated flattened tube section, and meet at the center of such tube section along a generally diamond-shaped flattened area 82 having a leading corner portion $82_a$ facing in an upstream direction relative to the combustion gas flow through the flattened tube section.

This illustrated indentation or dimple pattern provides combustion gas flow turbulence and a secondary gas flow parallel to the short axis of the generally oval-shaped flattened tube section, as well as serving to break up the boundary layer developed on the inside surface of the flattened tube section. Additionally, the diamond-shaped flattened areas 82 at the center of the flattened tube section cause the bulk of the combustion gas flow therethrough to split at those areas. This fluid splitting not only yields a large degree of inside flow turbulence, but also creates a secondary combustion gas flow directed parallel to the long axis of the oval flattened tube section. Such flow splitting, and the resulting fluid field, intensifies the previously described heat transfer enhancement. Moreover, the leading corner portions $82_a$ reduces the impingement loss associated with the combustion gas throughflow.

Another advantage of the oppositely sloped indentations 78, 80 is that they function to improve the air side heat transfer characteristics of the heat exchanger member 70. Due to the angle between the indentations 78, 80 and the flow direction of the air 38, a desirable degree of turbulence is also added to the air flow as it operatively traverses the heat exchanger. The air flow boundary layer developed of the outer surface of the tube becomes thinner due to the breaking-up action of the indentations similar to that imparted to the combustion gas flowing through the interior of the tube.

Figure 10:
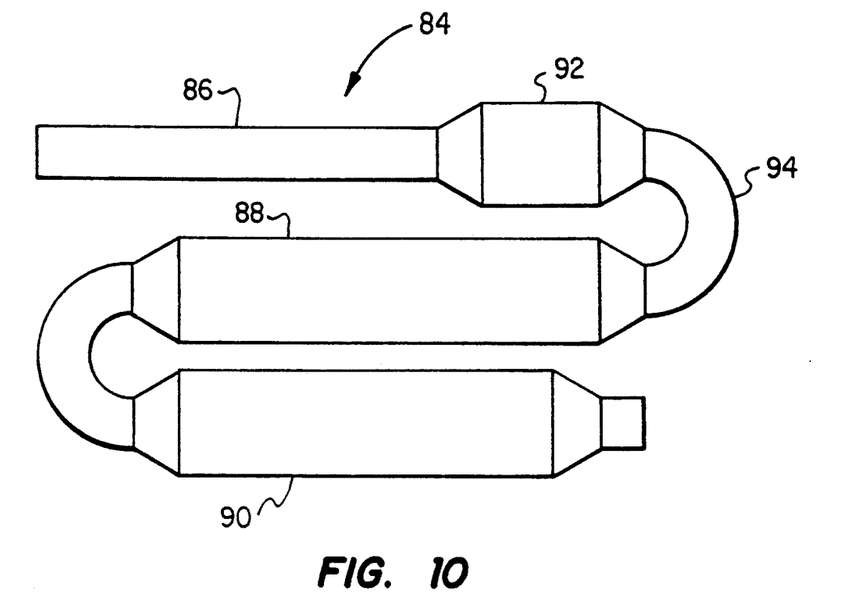
FIG. 10 is a side elevational view of a second alternate embodiment of a serpentined tube portion of the heat exchanger structure.

A second alternate embodiment 84 of the tubular metal heat exchanger member 44 is depicted in FIG. 10 and has a vertically serpentined configuration, and an essentially straight horizontal combustion section 86 positioned above a pair of horizontally flattened, but nonindented heat transfer sections 88 and 90. Additionally, a relatively short downstream end portion 92 of the combustion section 86 is horizontally flattened and narrowed to thereby increase the heat transfer rate of the section 86 and thus reduce the temperature of combustion gas entering the tube section 94 joining the sections 86 and 88. This advantageously tends to eliminate the "hot spot" normally occurring at the downstream end of the heat exchanger combustion zone. If desired, turbulence-inducing indentations (such as those previously described herein) can be formed in the opposite flattened sides of the tube sections 88, 90 and 92.

Figure 11:
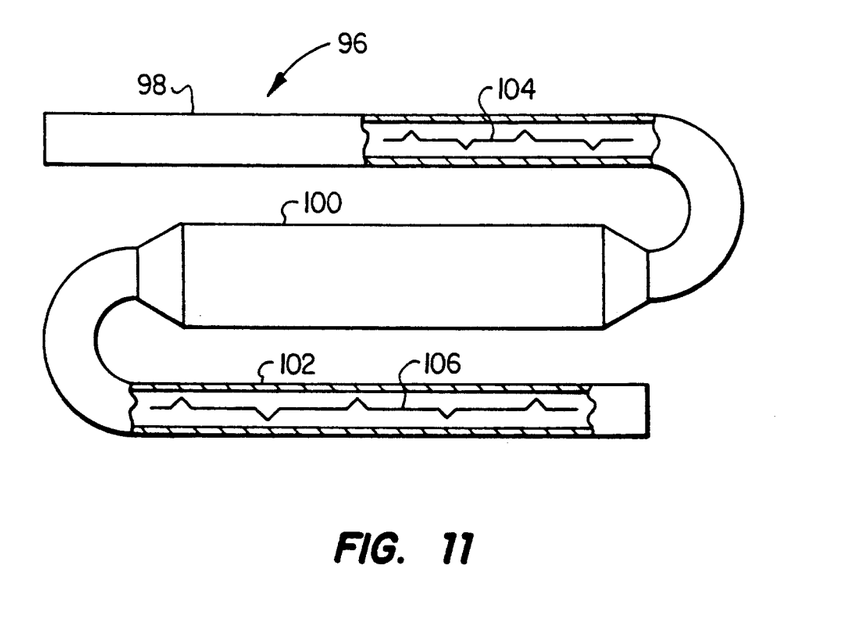
FIG. 11 is a partially cut away side elevational view of a third alternate embodiment of a serpentined tube portion of the heat exchanger structure.

A third alternate embodiment 96 of the tubular metal heat exchanger member 44 is shown in FIG. 11 and has a nonflattened combustion section 98, a horizontally flattened and narrowed intermediate heat transfer section 100, and a nonflattened lower heat transfer section 102. As schematically illustrated, conventional flow turbulator structures 104, 106 are operatively positioned within the tube sections 98 and 102 to create combustion gas flow turbulence within such sections.

The various enhanced tube surface configurations described above provide a high heat transfer rate and a low air side pressure loss which yields a high overall thermal performance. In addition to the improved thermal performance, other advantages are also realized in the illustrative heat exchanger tube configurations illustrated and described herein. For example, due to the heat exchanger member being formed from a single length of metal tubing, no intermediate connection structure is required between the combustion and heat transfer portions of the overall heat exchanger structure. The unity of the tubular structure results in part consolidation, reliability and reduction in the material and assembly costs associated with the overall heat exchanger structure. The inlet and outlet connections are circular tube portions which facilitates the inlet and outlet connections by using a convenient connecting method such as swaging or rolling. No welding or gasket connection is required. Accordingly, a fast and cost-effective manufacturing process can be achieved.

While the various serpentined tube structures illustrated and described herein have been representatively shown as being used to form a primary portion of a recuperative furnace heat exchanger (see FIG. 1), it will be readily appreciated by those skilled in this art that they could alternatively used as the sole combustion gas-to-air heat exchange structure in the illustrated furnace.

The foregoing detailed description is to be clearly understood as being given by way of illustration and example only, the spirit and scope of the present invention being limited solely by the appended claims.

What is claimed is:

1. A fuel-fired condensing furnace comprising:

a housing having an inlet opening and an outlet opening;

blower means operable to flow air sequentially into said inlet opening, through a flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said flow path within said housing and including:

(a) a primary heat exchanger structure having a metal combustor tube bent to a generally serpentined configuration and having an open inlet end for receiving a flame and resulting hot combustion gases from said burner means; an open outlet end for discharging the received combustion gases; an essentially straight combustion section longitudinally extending inwardly from said open inlet end and having a circular cross-section along its length; an essentially straight heat transfer section longitudinally extending inwardly from said open outlet end and being parallel to and laterally spaced apart in a first direction from said combustion section, said heat transfer section being flattened on opposite sides thereof in a second direction transverse to said first direction along a major portion of its length to enhance the heat transfer efficiency of said heat transfer section; and an essentially straight intermediate section disposed between and parallel to said combustion and heat transfer sections, a substantial longitudinal portion of said intermediate section being flattened, on opposite sides thereof, in said second direction to enhance the heat transfer efficiency of said intermediate section, and (b) a secondary heat exchanger structure having an inlet connected to said outlet end of said primary heat exchanger structure, and an outlet connected to said draft inducer fan means inlet.

2. A fuel-fired condensing furnace comprising:

a housing having an inlet opening and an outlet opening;

blower means operable to flow air sequentially into said inlet opening, through a flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace; and a recuperative heat exchanger structure operatively interposed in said flow path within said housing and including:

(a) a primary heat exchanger structure having a metal combustor tube bent to a generally serpentined configuration and having an open inlet end for receiving a flame and resulting hot combustion gases from said burner means; an open outlet end for discharging the received combustion gases; an essentially straight combustion section longitudinally extending inwardly from said open inlet end, having a circular cross-section along its length, and being configured to receive a first elongated turbulator structure longitudinally inserted thereinto through said open inlet end; an essentially straight heat transfer section longitudinally extending inwardly from said open outlet end and being parallel to and laterally spaced apart in a first direction from said combustion section, said heat transfer section having a circular cross-section along its length and being configured to receive a second elongated turbulator structure longitudinally inserted thereinto through said open outlet end; and an essentially straight intermediate section disposed between and parallel to said combustion and heat transfer sections, a substantial longitudinal portion of said intermediate section being flattened, on opposite sides thereof, in a second direction perpendicular to said first direction to enhance the heat transfer efficiency of said intermediate section, and (b) a secondary heat exchanger structure having an inlet connected to said outlet end of said primary heat exchanger structure, and an outlet connected to said draft inducer fan means inlet.

3. The fuel-fired condensing furnace of claim 2 further comprising:

first and second elongated turbulator structures respectively and operatively received within said combustion and heat transfer sections of said primary heat exchanger structure.

4. The fuel-fired condensing furnace of claim 2 wherein:

said flattened opposite sides of said intermediate section of said primary heat exchanger structure have spaced series of indentations formed therein and operative to increase the heat transfer efficiency of said intermediate section.

5. A fuel-fired forced air heating furnace comprising:

housing means through which supply air to be heated may be forced in a first direction;

blower means for forcing the supply air through said housing means in said first direction;

burner means operative to receive fuel and combustion air from sources thereof and to create from the received fuel and combustion air a flame and resulting hot combustion gases;

heat exchanger means disposed in said housing means in the flow path of supply air being forced therethrough by said blower means, said heat exchanger means being operative to externally transfer combustion heat to the supply air and including at least one heat exchanger member formed from a single length of metal tubing serpentined in a direction generally parallel to said first direction and having:

an essentially straight combustion section longitudinally extending transversely to said first direction, said combustion section having a circular cross-section along at least a major portion of its length, having an inlet end for receiving said flame, and being sized to permit essentially complete combustion therein of the burning fuel and air mixture delivered thereto by said burner means, and a heat transfer section having an outlet end for discharging said combustion gases, said heat transfer section including a second essentially straight length of said heat exchanger member extending along an axis parallel to said combustion section and spaced apart therefrom in said first direction, said second essentially straight length of said heat exchanger member, along at least a major longitudinal portion thereof, being flattened along first and second opposite side walls thereof in a manner substantially narrowing it in a direction transverse to said first direction to enhance combustion heat transfer from said heat exchanger means to the supply air being forced through said housing means by said blower means and exteriorly traversing said heat exchanger means; and means for creating combustion gas turbulence within said heat exchanger means, including first and second axially spaced series of indentations respectively formed in the first and second flattened opposite side walls of said second length of said heat exchanger member, the indentations in each of said first and second axially spaced series thereof being elongated and parallel to one another, and longitudinally extending generally perpendicularly to said axis, with the indentations in said first series thereof being longitudinally sloped at essentially identical first acute angles relative to said first direction, the indentations in said second series thereof being longitudinally sloped at essentially identical second acute angles being essentially equal to said first acute angles but opposite thereto relative to said first direction, the indentations in each of said first and second axially spaced series thereof, along their lengths, being inwardly curved toward said axis, said first and second axially spaced series of indentations being axially aligned with one another in a manner such that the indentations are arranged in facing, oppositely sloped pairs on opposite sides of said axis, with longitudinally central portions of each facing indentation pair being flattened against one another within the interior of said second length of said heat exchanger means.

6. The fuel-fired forced air heating furnace of claim 5 wherein:

the flattened longitudinally central portions of each facing indentation pair combinatively defining an abutment area having a pointed section oriented to intercept combustion gas flow through said second length of said heat exchanger member.

7. The fuel-fired forced air heating furnace of claim 6 wherein:

said abutment area has a generally diamond-shaped configuration.

8. The fuel-fired forced air heating furnace of claim 5 further comprising:

a turbulator structure disposed in a nonflattened longitudinal portion of said heat exchanger member and operative to create combustion gas turbulence therein.

9. The fuel-fired forced air heating furnace of claim 5 wherein:

said combustion section of said heat exchanger member has a downstream end portion flattened and narrowed in a direction transverse to said first direction.

10. A method of fabricating a heat exchanger for a fuel-fired forced air heating furnace, said method comprising the steps of:

providing an elongated hollow tubular metal heat exchanger member having a circular cross-section along its length and through which a burner flame and resulting hot combustion gases may be flowed;

bending said tubular heat exchanger member to an operating configuration in which it is serpentined in a first direction positionable generally parallel to a flow of furnace supply air to be intercepted and heated by said heat exchanger, the serpentined tubular heat exchanger member having an essentially straight combustion section with an inlet end adapted to receive the burner flame, and a heat transfer section having an outlet end for discharging combustion gas, said heat transfer section including at least one essentially straight heat exchange section parallel to said combustion section and spaced apart therefrom in said first direction;

flattened opposite first and second sides of each heat exchange section in a manner substantially narrowing it, relative to said combustion section, in a direction transverse to said first direction;

respectively forming on the flattened first and second opposite sides of each heat exchange section first and second spaced series of indentations operative to create turbulence in combustion gas flowing through the heat exchange section, said forming step being performed in a manner such that, on each heat exchange section, the indentations in each series thereof are elongated and generally parallel to one another, with the indentations in one series being longitudinally sloped at essentially identical first acute angles relative to said first direction, and with the indentations in said second series thereof being longitudinally sloped at essentially identical second acute angles relative to said first direction, said second acute angles being essentially equal to said first acute angles but opposite thereto relative to said first direction;

relatively orienting the two spaced series of indentations on each heat exchange section in facing pairs of oppositely sloped indentations on opposite flattened sides of the heat exchange section; and inwardly bending the facing indentation pairs in a manner flattening longitudinally central portions thereof against one another.

11. The method of claim 10 further comprising the step of:

positioning a combustion gas turbulator member in a nonflattened longitudinal portion of said heat exchanger member.

12. The method of claim 10 further comprising the step of:

flattening opposite sides of an outlet end portion of said combustion section in a manner substantially narrowing it in a direction transverse to said first direction.

13. A fuel-fired condensing furnace comprising:

a housing having an inlet opening and an outlet opening;

blower means operable to flow air sequentially into said inlet opening, through a flow path within said housing, and then outwardly through said outlet opening;

burner means for receiving a fuel-air mixture and discharging flames and hot products of combustion;

draft inducer fan means having an inlet and being operative to receive and discharge combustion gases generated during operation of said furnace;

a recuperative heat exchanger structure operatively interposed in said flow path within said housing and including:

(a) a primary heat exchanger defined by a horizontally spaced series of vertically serpentined metal combustor tubes having inlet ends positioned to receive flames and hot products of combustion discharged from said burner means, and outlet ends for discharging combustion gases, each of said serpentined metal combustor tubes having an essentially straight combustion section containing one of said inlet ends and sized to permit essentially complete combustion therein of the burning fuel-air mixture received from said burner means, and at least one essentially straight heat transfer section parallel to and spaced downwardly apart from said combustion section, each heat transfer section having opposite first and second horizontal side portions that are flattened in a manner horizontally narrowing the heat transfer section relative to said combustion section, and (b) a secondary heat exchanger disposed beneath said primary heat exchanger and including:

(1) a plastic inlet collector box connected to said outlet ends of said metal combustor tubes to receive combustion gases discharged therefrom, (2) a plastic outlet collector box connected to said draft inducer fan means inlet, and (3) a horizontally spaced series of elongated plastic heat transfer members having hollow, generally plate-like configurations with the side edge-to-side edge widths of said heat transfer members being generally vertically oriented, and end portions sealingly connected to said inlet and outlet collector boxes, said heat transfer members being operative to internally flow combustion gases from the interior of said inlet collector box to the interior of said outlet collector box for passage therefrom into the inlet of said draft inducer fan means;

indentation means formed in said pairs of opposite flattened sides of said heat transfer sections and operative to create turbulence in combustion gas being flowed through said heat transfer sections, said indentation means, on each of said pairs of opposite flattened sides on said heat transfer sections, including:

a first series of elongated, parallel indentations formed on one of the flattened sides and spaced apart from one another along the length of their associated heat transfer section, the indentations in said first series thereof being longitudinally sloped at a first acute angle relative to vertical, and a second series of elongated, parallel indentations formed on the other of the flattened sides and spaced apart from one another along the length of their associated heat transfer section, the indentations in said second series thereof being longitudinally sloped at a second acute angle relative to vertical, said second acute angle being generally equal to but opposite from said first acute angle relative to vertical, said first and second series of indentations being arranged in facing indentation pairs with the indentations in each facing pair thereof being positioned on opposite sides of the axis of their associated heat transfer section, with the indentations in each facing pair thereof being convexly curved and abutting along flattened, longitudinally central portions thereof within the interior of their associated heat transfer section.

14. The fuel-fired condensing furnace of claim 13 further comprising:

turbulator structures disposed within nonflattened longitudinal portions of said combustor tubes and operative to create turbulence in combustion gas flowing therethrough.

15. The fuel-fired condensing furnace of claim 13 wherein:

said combustion sections of said combustor tubes have horizontally flattened and narrowed outlet end portions.

* * * * *